Aug. 9, 1955 J. PILIERO 2,714,730
COIL SPRING FASTENING MEANS
Original Filed May 15, 1951
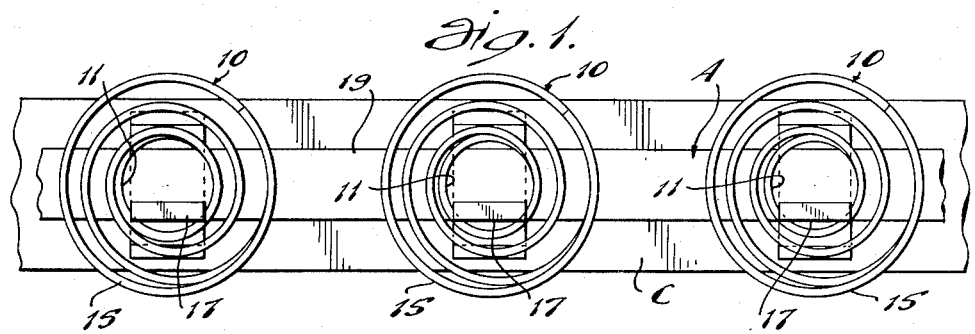
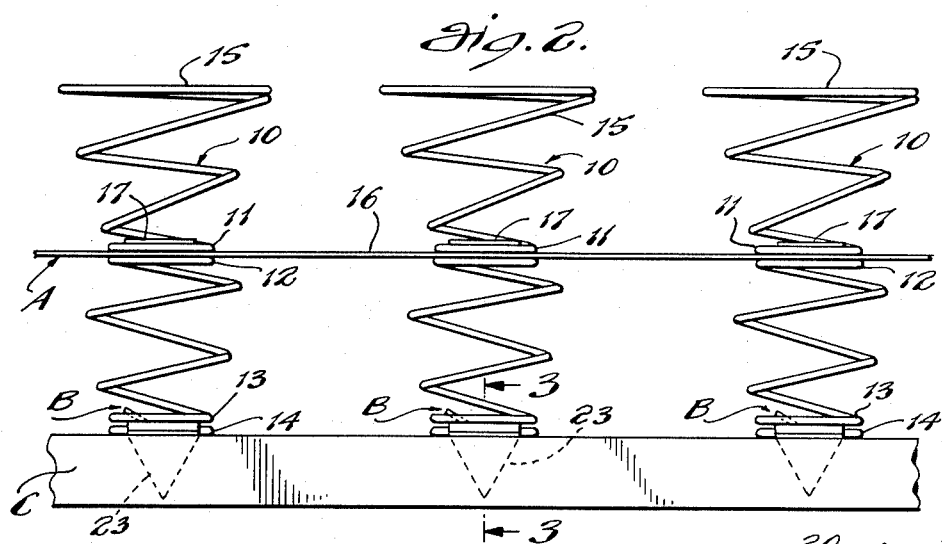
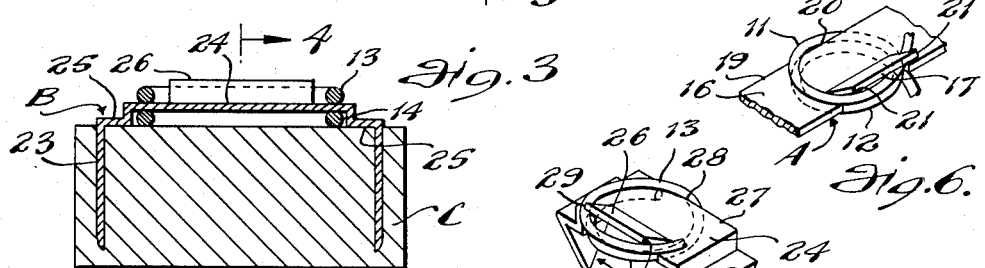
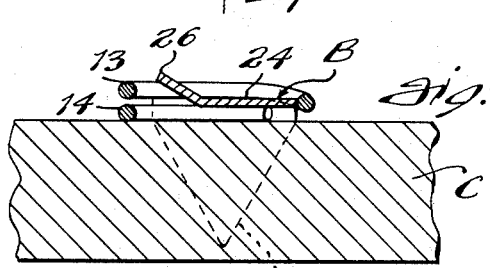
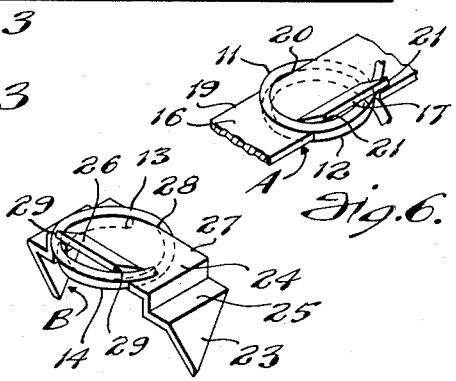
INVENTOR.
JAMES PILIERO
BY Clark & Ott
ATTORNEYS

United States Patent Office 2,714,730
Patented Aug. 9, 1955

2,714,730

COIL SPRING FASTENING MEANS

James Piliero, Chicago, Ill., assignor to The Englander Company, Inc., Chicago, Ill., a corporation of Delaware Original application May 15, 1951, Serial No. 226,349. Divided and this application February 4, 1954, Serial No. 408,149

1 Claim. (Cl. 5—252)

This invention relates to spring constructions for mattresses and the like, and the invention has particular reference to an improved fastening means for securing the coil springs in position, the application being a division of my copending application Serial No. 226,349.

The invention has in view an improved fastening means including a flat strip having an upstruck angularly disposed portion and which strip is adapted to be inserted between closely spaced convolutions of a spring to dispose the upstruck portion in protruding relation through one of the convolutions for securing the coil spring to the strip.

Still another object of the invention is to provide a fastening means of said character in which the upstruck angularly disposed portion of the strip is of a length less than the diameter of the adjacent convolutions of the coil and which upstruck portion is adapted to spread the convolutions apart when the strip is inserted therebetween and when the upstruck portion is disposed in position within the convolution, the convolutions are released to clamp the strip therebetween.

Another object of the invention is to provide an improved fastening means of said character whereby a plurality of upstruck angularly disposed portions may be provided in longitudinally spaced relation for engagement between the convolutions of a plurality of springs with the upstruck portions thereof protruding through one of the convolutions of each spring for securing the several springs to the strip.

With the foregoing and other objects in view, reference is now made to the following specification and accompanying drawings in which the preferred embodiments of the invention are illustrated.

In the drawings:

Fig. 1 is a top plan view of a plurality of coil springs which are secured in aligned spaced relation by improved fastening means constructed in accordance with the invention.

Fig. 2 is a view in elevation thereof.

Fig. 3 is an enlarged fragmentary sectional view taken approximately on line 3—3 of Fig. 2.

Fig. 4 is an enlarged sectional view taken approximately on line 4—4 of Fig. 3.

Fig. 5 is a perspective view of one of the fastening means.

Fig. 6 is a fragmentary perspective view of another one of the fastening means.

Referring to the drawings by characters of reference, the improved fastening means is adapted for securing coil springs 10 of a box spring, mattress and the like in fixed formation in a spring structure. In one form of the invention, the improved fastening means indicated by the reference character A is adapted to engage between adjacent convolutions 11 and 12 located substantially centrally of each of the coil springs 10 for securing the coil springs in spaced relation in the spring structure with one or both of the opposite ends of the coil springs being free to flex and bend laterally and inwardly. In another form of the invention, the fastening means indicated by the reference character B is adapted to engage between adjacent convolutions 13 and 14 at one end of each of the coil springs 10 for securing the same to a rigid support C which forms a base for the springs of a box spring and the like.

In the embodiment illustrated, three coil springs 10 are shown but it is to be understood however, that any number of coil springs 10 may be secured in alignment in the spring structure and that parallel rows of springs may be provided and secured to the base C to provide any desired length and width of spring structure. The springs 10 have the convolutions 11 and 12 normally disposed in tensioned engagement and in parallel relation with the uppermost convolution 15. The convolutions 13 and 14 are likewise normally disposed in tensioned engagement and in parallel relation with the convolutions 11 and 12 and the uppermost convolution 15.

The fastening means A consists of a flexible spring strip 16 which is slightly narrower than the internal diameter of the convolutions 11 and 12 and the spring strip 16 is cut and bent to provide upstruck tongues 17 which are formed from a longitudinal edge portion of the strip and extend upwardly in angular relation from the body thereof. The upstruck tongues 17 are slightly shorter than the internal diameter of the convolutions 11 and 12 and the same are struck up a distance at the outer edge thereof slightly greater than the thickness of the spring material forming the springs 10. The said tongues are located at longitudinally spaced distances along the entire length of the strip 16 so as to engage between the convolutions 11 and 12 of a spring 10 at each of said locations. In securing the springs 10 to the strip 16, the strip is inserted between the convolutions 11 and 12 at the locations of the upstruck tongues 17 which tongues function to spread the convolutions 11 and 12 apart so that when the longitudinal edge 19 of the strip 16 is disposed in abutting engagement with the portion of the spring joining the convolutions 11 and 12, as at 20, the upstruck tongues 17 will be located wholly within the confines of the upper convolutions 11 and will project therethrough with the corners 21 thereof disposed in adjacent relation to said convolutions respectively at oppositely disposed points. When the upstruck tongues are thus located within the confines of the convolutions 11, the convolutions 11 and 12 will return to close parallel relation so as to tightly clamp the strip 16 therebetween. The strip is thus securely held in position between the convolutions of the several springs to thereby prevent disengagement thereof since the tension of said convolutions prevents the expansion of the same to permit of the withdrawal of the strip and upstruck tongues 17.

The lower ends of the springs 10 are each anchored to the base C by means of one of the fastening means B which is provided with pointed terminals 23 at the ends thereof adapted to be driven into the base. The said fastening means is constructed from a length of flat spring strip which is cut and bent to form the pointed terminals 23 and a medial upstanding portion 24 located intermediate opposite end portions 25. The medial portion 24 is raised a sufficient distance to receive and tightly hold the convolutions 14 between the same and the base C when the pointed terminals 23 are driven into the base with the opposite end portions 25 tightened against the upper surface of the base.

The medial portion 24 is provided with an upstruck tongue 26 similar to the upstruck tongues 17 in the fastening means A. The said tongue is slightly shorter than the internal diameter of the convolution 13 and the same is struck up a distance at the outer edge thereof slightly greater than the thickness of the material forming the spring 10. The fastening means B may be arranged in any desired relation with reference to the fastening means A and as illustrated the same is disposed at right angles thereto. The medial portion 24 is slightly narrower than the internal diameter of the convolutions 13 and 14 and when the medial portion 24 is inserted between the convolutions 13 and 14, the upstruck tongue 26 will force the convolutions apart until the tongue is located within the confines of the convolution 13. When the tongue 26 is thus located the convolutions 13 and 14 will return to close parallel relation so as to tightly clamp the medial portion 24 between the said convolutions and the rear edge 27 thereof will be in abutting engagement with the portion of the spring joining the convolutions 13 and 14 as at 28 with the opposite corners 29 of the tongue 26 disposed in adjacent relation to the upper convolution 13 at oppositely disposed points. There is thus provided attaching means by which a plurality of coils may be connected together intermediate their ends in longitudinal alignment in a spring structure such as a box spring mattress and the like and the lower ends thereof may be securely fastened to a base forming a part of the spring structure.

What is claimed is:

An attachment for connecting together a plurality of coil springs each having two convolutions disposed in close relation, said attachment including an elongated flat metal strip engaging through the springs between each of said two convolutions, said strip having spring tongues struck outwardly from the plane thereof in angular relation therewith and extending longitudinally of said strip with the outer longitudinal edges of said tongues disposed outwardly of the plane of said strip and there being only one tongue for each spring said tongues each being elongated to span a substantial arc of one of said two convolutions of said springs respectively and with the outer longitudinal edge portions of the tongues protruding through said convolutions to dispose opposite outer corners of the tongues in overextending relation therewith, and said strip having its longitudinal edge opposite the outer edges of said tongues tensioned against the portions of the springs connecting the two convolutions thereof together to thereby fasten the coils to said attachment.

References Cited in the file of this patent

UNITED STATES PATENTS

| | | |
|---|---|---|
| 882,600 | Weborg | Mar. 24, 1908 |
| 1,880,137 | Hilton | Sept. 27, 1932 |
| 2,642,932 | Neely et al. | June 23, 1953 |